Sept. 11, 1956 W. J. MORDARSKI ET AL 2,762,600
SHOCK MOUNT
Filed July 27, 1953 2 Sheets-Sheet 1

INVENTORS
Walter J. Mordarski
+ William H. Spencer
BY Rockwell & Bartholow
ATTORNEYS Sept. 11, 1956  W. J. MORDARSKI ET AL  2,762,600
SHOCK MOUNT
Filed July 27, 1953  2 Sheets-Sheet 2

INVENTORS
Walter J. Mordarski
William H. Spencer
BY
Rockwell & Bertholay
ATTORNEYS United States Patent Office 2,762,600
Patented Sept. 11, 1956

2,762,600
SHOCK MOUNT

Walter J. Mordarski, Meriden, and William H. Spencer, East Haven, Conn., assignors to The Connecticut Hard Rubber Company, New Haven, Conn., a corporation of Connecticut Application July 27, 1953, Serial No. 370,266

4 Claims. (Cl. 248—358)

This invention relates to anti-vibration or shock mounts and more particularly to a mount or supporting means for a relatively heavy object such that such object may be supported during transportation thereof in a manner in which it will not be damaged from shocks or vibrations to which it may be subjected.

The present invention relates to devices of this character similar in some respects to those shown in our applications Serial No. 311,832, filed September 27, 1952, now Patent No. 2,719,017, and Serial No. 346,722, filed April 3, 1953, now Patent No. 2,743,892. In constructing a support or mount for the described purpose, it is desirable to provide a structure which will absorb a large amount of energy without placing too high a peak load upon the mounting unit and without making the resilient element so soft as to allow excessively large deflections. In general these mounts comprise a rigid outer member of hollow form, usually, but not necessarily, of cylindrical shape and an inner member, usually the load-carrying member, which is spaced from the wall of the outer member, and between these inner and outer members is a body of resilient rubber or rubber-like material. This material may be natural rubber, one of the organic synthetic rubbers, or silicone rubber, and is so shaped that the inner surface of the resilient body is of frusto-conical form so that its surface slopes upwardly from the wall of the outer member to the inner load-carrying member.

It has been found that such a unit, while suitable for many situations, has certain limitations which the present invention is designed to correct. For example, these shock mounts, when made in a given size with a suitable resilient material, will provide for a given deflection under a given load. In some instances it may be desired to provide a greater deflection for the same load than is obtained from the use of a shock mount comprising a single unit. If, however, the body of resilient material is made softer so as to increase the deflection, it is apt to become limp and unsteady and hence impractical.

Also, in some instances it is desired to produce a mount which will sustain a greater load, say, for example, double the load, without the deflection being increased. It has been found that such variations may be produced by combining the units shown in our previous applications in such a manner that the deflection may readily be increased for the same load or by another combination the load may be increased without increasing the deflection. This may be accomplished without varying the size of the structure of the units themselves.

As illustrated herein, this result is obtained by using a plurality of units such that the load will be sustained by a plurality thereof, and the units may be combined in series, so to speak, so that two or more units will act together to sustain a load in order that a greater load may be supported without increasing the deflection, or by arranging the units so that the load carried by one will also be wholly impressed upon the other or others so that the deflection will be increased for a given load over that which occurs when a single unit is employed.

One object of the present invention is to provide a new and improved resilient mount for supporting a load to prevent shock or vibration damage to the supported load.

Still another object of the invention is to provide an anti-vibration resilient load-supporting mount which will be constructed of a plurality of units, the units being so combined that various load-deflection curves may be obtained according to the characteristic desired in the finished structure.

A still further object of the invention is to provide a new and improved vibration damping mounting composed of a plurality of units, each consisting of an outer rigid member and an inner rigid member joined by a body of resilient material having a lower surface of frusto-conical form, the units being placed in axial alignment and so connected together that all will cooperate to support a given load with either greater or less deflection than would be obtained by the use of a single unit according to the arrangement of the units in the completed structure.

To these and other ends the invention consists in the novel features and combinations of parts to be hereinafter described and claimed.

Figure 1:
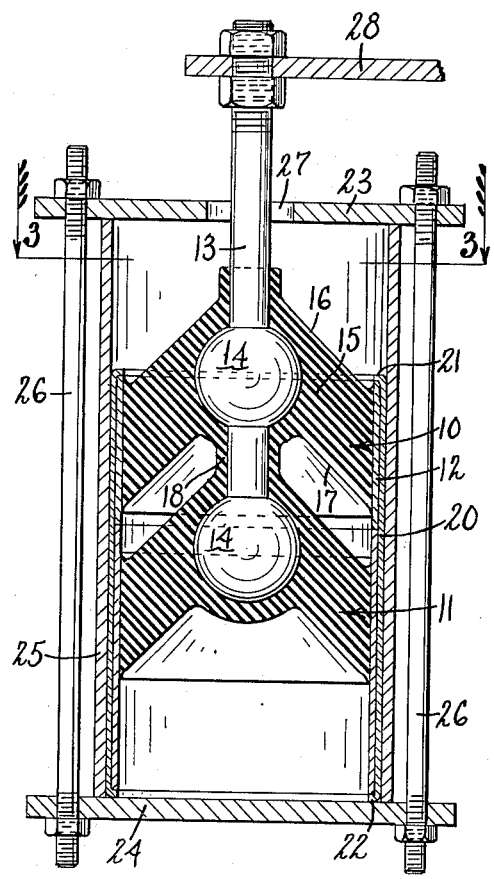
Fig. 1 is a sectional view of a shock mount embodying our invention, employing two units arranged in series so that they will cooperate to support a given load.

To illustrate one preferred embodiment of our invention we have shown in Fig. 1 of the drawings a shock mount comprising a pair of units designated generally by the numerals 10 and 11. Each of these units comprises an outer rigid hollow member 12 and an inner rigid member in the form of a stem 13 having a spherical portion 14 at its lower end. Disposed between the outer member 12 and the inner rigid member is a body of resilient material 15 which may be of some rubber-like material such, for example, as natural rubber, one of the organic synthetic rubbers, or silicone rubber.

The rubber-like resilient material 15 is bonded to both the outer rigid member and the inner rigid member so as to form a compact unit. It will be noted that, as shown in the drawings, the body of resilient material is conical or frusto-conical in form both upon its outer surface 16 and its inner surface 17, these surfaces extending upwardly and inwardly from the outer periphery of the member toward its axis. In the present instance the members 12 are of hollow cylindrical form although their shape may be varied.

The spherical portion 14 of each of the units is embedded within the resilient body 15 so as to be enclosed therein and bear against this material when weight is applied to the member 13. Also, it will be noted that, as illustrated, the stem 13 of the lower unit extends upwardly to engage the lower surface of the spherical member 14 of the upper unit and, if desired, the two rubber-like portions 15 may be connected by a neck 18 of the same material which surrounds the lower stem 13. This neck may or may not be employed, but it is a convenient arrangement in the manufacture of the device and tends to hold the two units in assembled relation.

The rigid cylindrical members 12 may be formed integrally but it is convenient in the manufacture of the device to provide them as separate members. They are shown as secured together in assembled relation by a sleeve 20 which embraces both members and the ends of which are peened or rolled over the upper and lower edges respectively of the members 12, as shown at 21 and 22, so that the two units will be held in assembled relation. With this construction the two outer rigid members 12 form a shell within which the two units are contained.

A support for the entire structure heretofore described may be constituted by spaced upper and lower plates 23 and 24 between which is a tubular or cylindrical member 25 of relatively heavy rigid material to give lateral support to the sleeve 20. The plates 23 and 24 may be secured together by bolts 26.

The upper plate 23 is provided with an opening 27 through which the upper stem 13 extends where it may be provided with a load-carrying member 28 which may be secured to the load which the mount is to carry.

It will be apparent that with this construction any load applied to the member 28 and upper stem 13 will be transmitted in part to the stem 13 of the lower member so that the load is supported by the combined effort of both of the units 10 and 11. As these two units combine to support the load, it will be apparent that the mount will be stiffer or adapted to support a greater load with the same deflection than if one of the units is used alone. For example, if a single unit is so constructed that it will support a load of 900 pounds with a deflection of 3 inches, the assembly consisting of the two units will support twice this load or one of 1,800 pounds with the same deflection. Thus by combining two or more of the units 10 and 11, we may secure, within limits, any desired deflection for any given load or may provide an arrangement which will support any desired load with a given deflection. It is not practicable to secure these results by varying the characteristics of a single unit and, if the characteristics of the resilient material are varied in an attempt to effect this result, the material will become too rigid or too weak and limp for satisfactory performance.

Figure 2:
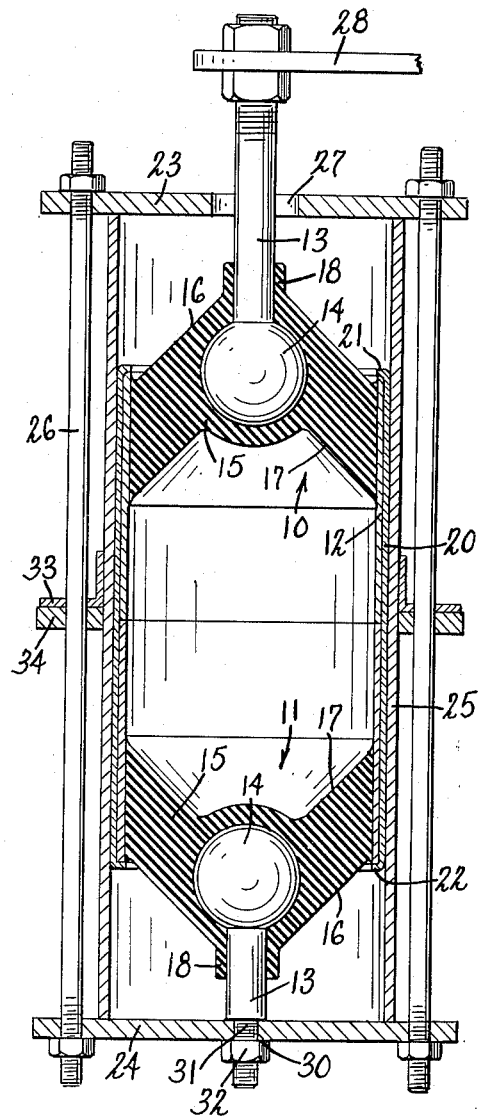
Fig. 2 is a sectional view of a shock mount embodying a pair of units arranged in "parallel" or "back to back" relation such that the deflection for a given load will be greater than that of a single unit.

In Fig. 2 of the drawings, we have shown another arrangement of units where the two are positioned "back to back" and act in parallel with each other. In this instance the units 10 and 11 are made as before except that they are entirely separate one from another and are placed together so that the stems 13 extend in opposite directions. The sleeve 20 embraces the outer rigid members 12 of the units and holds them in assembled relation as before. In each instance the spherical members 14 are embedded in the rubber so as to bear against the resilient body when a load is sustained by the assembly.

Also in this instance a support is provided consisting of spaced plates 23 and 24 between which is the relatively heavy rigid tubular member 25 supporting the sleeve 20 as before. In this instance the lower stem 13 is secured to the lower plate 24 as shown at 30 so that it bears thereagainst, while the upper member 13 extends through the opening 27 in the plate 23 as before and has secured thereto the load-carrying member 28. It will be apparent that the lower stem 13 rests upon the plate 24, and the securing means at 30 may be conveniently provided by threading the lower reduced end of the stem 13, as shown at 31, and placing thereon the nut 32. The entire unit may be supported in any suitable manner, such as by the angle member 33 secured to the tubular member 25 and resting upon the support 34.

It will be apparent that with this arrangement when a load is applied to the member 28, the load will cause equal deflection of both of the units, the sleeve 20 sliding downwardly within the outer tubular member 25. Moreover, the resilient bodies of both of the units will be deflected an amount equal to that which would occur if the load were borne by a single unit so that the total deflection of the arrangement shown in Fig. 2 under a given load will be double that which would be the case if a single unit were employed. For example, if a single unit 10 were employed and so constructed as to show a deflection of 3 inches under a load of 900 pounds, the arrangement shown in Fig. 2 would show a deflection of 6 inches under a similar load.

Figure 4:
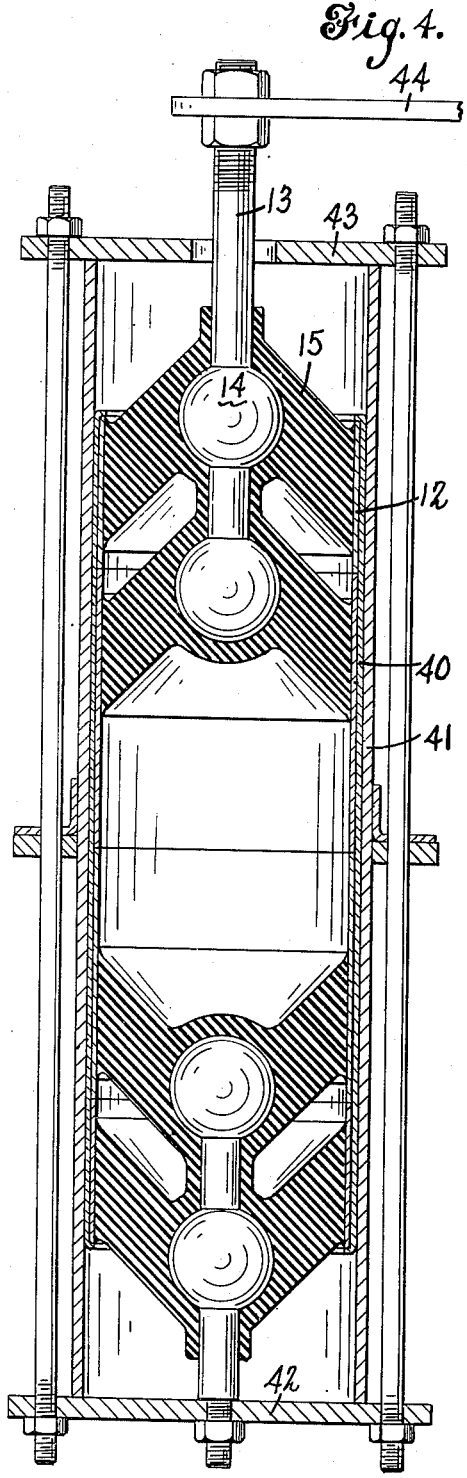
Fig. 4 is a sectional view showing a combination of parallel and series arrangement.
Figure 3:
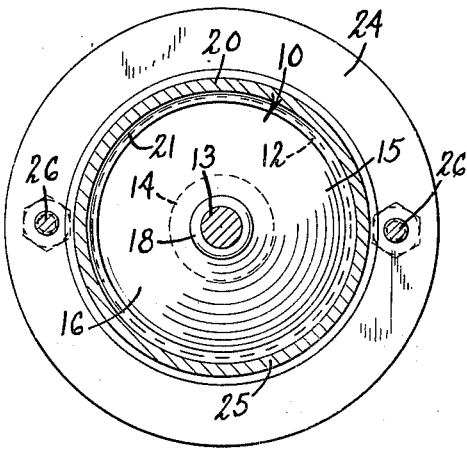
Fig. 3 is a sectional view on line 3—3 of Fig. 1.

In Fig. 4 of the drawings, we have shown an arrangement wherein two of the combinations shown in Fig. 1 are placed in a back-to-back arrangement so that four units in all are employed, two acting in series and two in parallel. In this arrangement an outer shell 40 is employed to hold all of the units together but otherwise the arrangement is similar to that previously described. The shell 40 is slidably contained within the sleeve 41 secured between the upper and lower plates 42 and 43.

Again the stem 13 of the upper unit is extended through the plate 43, and to its extended end is secured load-supporting member 44.

It will be apparent that with this arrangement the two upper units would support twice the load of one unit while showing the same deflection. However, when combined with the two lower units, as shown in this figure, the deflection would be doubled so that the result of the entire arrangement shown in this figure is that the assembly would support double the load of one unit but would also show double the deflection of a single unit.

Therefore, if it is desired to support a larger load with a greater deflection than may be obtained with a single unit, the arrangement shown in Fig. 4 may be employed. It will, of course, be understood that, if desired, more than two of the units may be combined in series or in parallel arrangement and various results obtained, bearing in mind that arrangement of the units in series, as shown in Fig. 1, will always permit a greater load to be carried with the same deflection, or connecting the units in parallel, as shown in Fig. 2, will provide a unit which will show a greater deflection for the same load than will a single unit.

While we have shown and described some preferred embodiments of our invention, it will be understood that it is not to be limited to all of the details shown, but is capable of modification and variation within the spirit of the invention and within the scope of the claims.

What we claim is:

1. A shock mount comprising a plurality of units, each of said units including a rigid outer member, a rigid inner member, and a resilient body of rubber-like material bonded to both of said members, the inner and outer surfaces of said body being substantially frusto-conical in shape inclined in the same direction and concentric about a common axis, the outer member of one unit being in alignment with and bearing upon the outer member of the adjacent unit, a sleeve embracing the outer members of the units to hold them in assembled relation, an outer tubular member of greater length embracing said sleeve and held immovable relative thereto to provide lateral support and allow sliding vertical movement of the sleeve relative to the tubular member, and supporting means holding the tubular member and sleeve, said outer tubular member being rigidly held in relation to said supporting means.

2. A shock mount comprising a plurality of units placed in end-to-end abutting position, each of said units including an inner rigid member and an outer hollow rigid member and a resilient body of rubber-like material between said members and bonded to both thereof, said body having inner and outer surfaces of frusto-conical shape, a ing inner and outer surfaces of frusto-conical shape inclined in the same direction and concentric about a common axis, a sleeve embracing said outer member for holding said units in aligned assembled relation with the adjacent edges of the outer members of the adjacent units in abutting end-to-end relation, an outer tubular member of greater length embracing said sleeve and held immovable relative thereto to provide lateral support and allow sliding vertical movement of the sleeve relative to the tubular member, and supporting means holding the tubular member and sleeve, said outer tubular member being rigidly held in relation to said supporting means.

3. A shock mount comprising an outer rigid shell, a pair of inner rigid members disposed substantially centrally of said shell in axial alignment, a body of resilient material between each of said members and said shell and bonded to the inner members and to the shell, the inner and outer surfaces of each of said bodies being substantially of frusto-conical form inclined in the same direction and concentric about a common axis; means for supporting said mount whereby a force applied to one of said inner members is transmitted to the shell and tends to flatten the cone-shaped surfaces of both said body portions, and an outer tubular member carried by the supporting means and embracing said shell in which the shell is slidably mounted, said outer tubular member being of greater length and held immovable relative to said shell.

4. A shock mount comprising a plurality of units placed in end-to-end abutting position, each of said units including an inner rigid member and an outer hollow rigid member and a resilient body of rubber-like material between said members and bonded to both thereof, said body having inner and outer surfaces of frusto-conical shape inclined in the same direction and concentric about a common axis, a sleeve engaging the outer members of the units for holding said units in aligned assembled relation with the adjacent edges of the outer members of the adjacent units in abutting end-to-end relation, the adjacent ends of said inner members being spaced from each other, and the remote ends of said inner members projecting from their respective resilient bodies in opposite directions, and means for supporting the mount on one of said projecting ends, an outer tubular member of greater length embracing said sleeve and held immovable relative thereto to provide lateral support and allow sliding vertical movement of the sleeve relative to the tubular member, said outer tubular member being rigidly held in relation to said supporting means.

References Cited in the file of this patent

UNITED STATES PATENTS

| | | |
|---|---|---|
| 2,019,052 | Lord | Oct. 29, 1935 |
| 2,179,469 | Germonprez | Nov. 7, 1939 |
| 2,376,277 | Rouy | May 15, 1945 |

FOREIGN PATENTS

| | | |
|---|---|---|
| 576,173 | Great Britain | Mar. 21, 1946 |
| 621,693 | Great Britain | May 15, 1945 |
| 804,147 | France | July 27, 1936 |
| 829,524 | France | Apr. 5, 1938 |